(12) United States Patent
Dettinger et al.

(10) Patent No.: US 7,158,969 B2
(45) Date of Patent: Jan. 2, 2007

(54) ITERATIVE DATA ANALYSIS PROCESS VIA QUERY RESULT AUGMENTATION AND RESULT DATA FEEDBACK

(75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 10/459,734

(22) Filed: Jun. 12, 2003

(65) Prior Publication Data

US 2004/0254924 A1 Dec. 16, 2004

(51) Int. Cl.
G06F 17/30 (2006.01)
(52) U.S. Cl. .......................................... 707/4
(58) Field of Classification Search ................ 707/1, 707/2, 3, 102, 4; 709/224
See application file for complete search history.

(56) References Cited

U.S. PATENT DOCUMENTS

| | | |
|---|---|---|
| 5,870,746 A | 2/1999 | Knutson et al. |
| 6,266,660 B1 | 7/2001 | Liu et al. |
| 6,516,312 B1 | 2/2003 | Kraft et al. |
| 6,594,654 B1 * | 7/2003 | Salam et al. ............. 707/3 |
| 6,725,227 B1 | 4/2004 | Li |
| 2001/0016843 A1 * | 8/2001 | Olson et al. ............ 707/3 |
| 2001/0034733 A1 * | 10/2001 | Prompt et al. ........... 707/102 |

OTHER PUBLICATIONS

Dettinger et al., IBM U.S. Appl. No. 10/131,984 (ROC920020089US1) filed Apr. 25, 2002. "Remote Data Access and Integration of Distributed Data Sources Through Data Schema and Query Abstraction".

* cited by examiner

*Primary Examiner*—Etienne P LeRoux
(74) *Attorney, Agent, or Firm*—Patterson & Sheridan, LLP; William J. McGinnis

(57) ABSTRACT

The present invention is generally directed to a system, method and article of manufacture for accessing data represented abstractly through an abstraction model. In one embodiment, a data abstraction model provides a logical view of an underlying data repository that is independent of the particular manner of data representation. For a given abstract query, the abstract query is augmented with additional computer-selected result fields. In addition, the data abstraction model is also augmented with fields corresponding to the result fields of the previously executed abstract query.

48 Claims, 13 Drawing Sheets

ITERATIVE DATA ANALYSIS PROCESS VIA QUERY RESULT AUGMENTATION AND RESULT DATA FEEDBACK

CROSS-RELATED APPLICATIONS

One approach for accessing a multiplicity of data sources is described in more detail in U.S. patent application Ser. No. 10/131,984, entitled "REMOTE DATA ACCESS AND INTEGRATION OF DISTRIBUTED DATA SOURCES THROUGH DATA SCHEMA AND QUERY ABSTRACTION" and assigned to International Business Machines, Inc.

BACKGROUND OF THE INVENTION

1. Field of the Invention

The present invention generally relates to data processing, and more particularly, to the accessing data through a logical framework.

2. Description of the Related Art

Databases are computerized information storage and retrieval systems. The most prevalent type of database is the relational database, a tabular database in which data is defined so that it can be reorganized and accessed in a number of different ways. A relational database management system (DBMS) is a database management system that uses relational techniques for storing and retrieving data.

Regardless of the particular architecture, in a DBMS, a requesting entity (e.g., an application, the operating system or a user) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

In many cases, particularly in research-oriented environments, the task of analyzing information is typically a multi-step, iterative process involving generation of an initial set of query results, analysis of initial set of query results, and comparison of the initial set of query results with other available information to yield another set of data results. For example, in a medical research environment, a first query could be posed to find a set of research candidates meeting a particular diagnosis or test result profile. In a large data warehouse environment, it may take a lot of time and resources to process a query of this nature, in particular if the criteria specified is complex. Once the query results are returned, it may be desirable to run a second query correlating the results of the first query with other information in the full data repository to find, e.g., all individuals living at the same address or within the same town as those individuals found to meet the particular diagnosis or test result profile specified in the first query. Accordingly, information returned by the first query is correlated with other information in the data repository to yield additional information and knowledge discovery.

Unfortunately, current methods to address this scenario are typically rather manual and error prone. Specifically, the user is required to go through several steps to save the results from the original query in a form that would allow for subsequent queries to be performed against it. In a relational environment, this would require a table to be created to hold the results of the original query. Similarly, in an XML-based repository, query result data would need to be stored in the repository in order to be re-queried. In either case, the user would then need to understand the physical schema used to represent the initial query results and express a subsequent query taking this schema into account. Also, in order to correlate initial query results with other information in the data repository, the user must be aware of key relationships between the query result set and other entities in the data repository and must include this key relationships in the original query and corresponding result set to enable correlation with the rest of the data repository.

Therefore, what is needed is a query framework providing flexibility in data analysis.

SUMMARY OF THE INVENTION

The present invention provides a method, system and article of manufacture for accessing physical data through an abstraction model. The abstraction model includes metadata describing and defining a plurality of logical fields.

One embodiment provides a method of using a logical model to query physical fields of physical data entities. The method includes defining the logical model to logically describe the physical fields; and for each abstract query comprising query conditions and query result fields to be returned, augmenting the logical model to logically describe, in addition to the physical fields, results returned for each abstract query based on the query result fields.

Another embodiment provides a method of using a logical model to query data, and includes defining the logical model to logically describe the data, wherein the logical model comprises a plurality of logical field definitions mapping to physical fields of physical entities of the data; receiving a user-defined abstract query, wherein the user-defined abstract query is created using the logical field definitions of the logical model and includes at least one condition and at least one user-selected result field selected from the logical field definitions; augmenting the user-defined abstract query with at least one computer-selected result field to produce an augmented abstract query; and wherein the augmented abstract query returns results for each of the user-selected result field and the computer-selected result field; and augmenting the logical model to logically describe, in addition to the data, the results returned based on the result fields.

Another embodiment provides a method for processing abstract queries defined by logical fields. The method includes providing an initial abstract data model defining a plurality of logical fields mapped to physical data having a particular schema and further defining a plurality of relationships between at least a portion of the plurality of logical fields; receiving a first abstract query comprising at least one condition and a user-selected result field comprising at least one of the plurality of logical fields; based on defined relationships between the user-selected result field and the other plurality of logical fields, augmenting the first abstract query with at least one computer-selected logical field selected from the plurality of logical fields; transforming the first abstract query into a first executable query with reference to the initial abstract data model; executing the first executable query; returning results produced by execution of the first executable query; and adding at least one additional logical field to the initial abstract data model to produce a first augmented abstract data model, the at least one additional logical field mapping to at least a portion of the results.

Yet another embodiment provides a computer readable medium containing a program which, when executed, performs an operation with respect to abstract queries and a logical model comprising a plurality of logical field definitions mapping to physical fields of physical entities of the data. The operation includes, for each abstract query comprising query conditions and query result fields to be returned, augmenting the abstract query with at least one additional query result field, thereby producing an augmented abstract query; and for each executed augmented abstract query which returns results based on the query result fields of the executed augmented abstract query, augmenting the logical model to logically describe the results returned for the executed augmented abstract query.

Still another embodiment provides a computer readable medium containing a program which, when executed, performs an operation with respect to abstract queries and a logical model comprising a plurality of logical field definitions mapping to physical fields of physical entities of the data. The operation includes receiving a user-defined abstract query, wherein the user-defined abstract query is created using the logical field definitions of the logical model and includes at least one condition and at least one user-selected result field selected from the logical field definitions; augmenting the user-defined abstract query with at least one computer-selected result field to produce an augmented abstract query; and wherein the augmented abstract query returns results for each of the user-selected result field and the computer-selected result field; and augmenting the logical model to logically describe, in addition to the data, the results returned based on the result fields.

Still another embodiment provides a computer system, comprising memory and at least one processor, and further comprising a logical model comprising a plurality of logical field definitions mapping to physical fields of physical entities of data, whereby the logical model provides a logical view of the data; an abstract query augmenter configured to (i) receive an abstract query comprising at least one condition and at least one user-selected result field selected from the logical field definitions of the logical model; and (ii) augment the abstract query with at least one computer-selected result field selected from the logical field definitions of the logical model, thereby producing an augmented abstract query; and a logical model generator configured to augment the logical model with additional logical field definitions based on (i) the result fields of the augmented abstract query; and (ii) results returned for the augmented abstract query.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

One embodiment of the invention is implemented as a program product for use with a computer system and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

In one embodiment, a particular data definition framework, also referred to herein as a data abstraction model (DAM), is provided for accessing (e.g., querying and modifying) data independent of the particular manner in which the data is physically represented. The DAM includes metadata describing and defining a plurality of logical fields which map to physical data. A user-specified query is augmented to include additional return fields needed, for example, to correlate query results with other physical data. In addition, the DAM is augmented to include additional logical fields which map to the fields of the results of the query. The DAM may also be augmented to reflect relationships between the results and other data of the complete database. A subsequent query is then executed based on the augmented DAM.

Physical View of Environment

Figure 1:
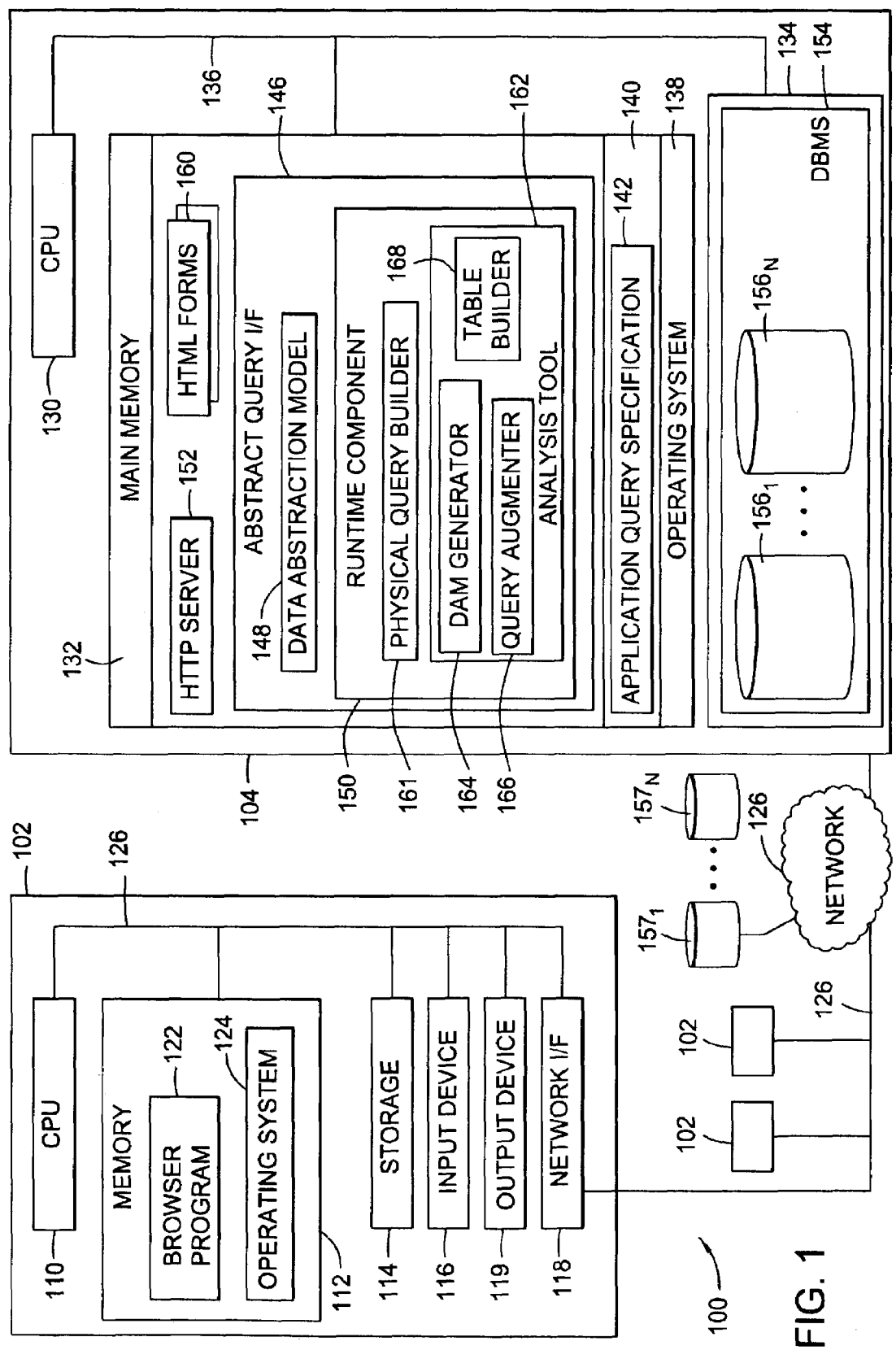
FIG. 1 is a block diagram of an illustrative computer architecture.

FIG. 1 depicts a block diagram of a networked system 100 in which embodiments of the present invention may be implemented. In general, the networked system 100 includes a client (i.e., generally any requesting entity such as a user or application) computer 102 (three such client computers 102 are shown) and at least one server computer 104 (one such server computer 104 is shown). The client computer 102 and the server computer 104 are connected via a network 126. In general, the network 126 may be a local area network (LAN) and/or a wide area network (WAN). In a particular embodiment, the network 126 is the Internet. However, it is noted that aspects of the invention need not be implemented in a distributed environment. As such, the client computers 102 and the server computer 104 are more generally representative of any requesting entity (such as a user or application) issuing queries and a receiving entity configured to handle the queries, respectively.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DAMM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products composing a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database. Illustrative sources against which queries may be issued include local databases $156_1 \ldots 156_N$, and remote databases $157_1 \ldots 157_N$, collectively referred to as database(s) 156–157. Illustratively, the databases 156 are shown as part of a database management system (DBMS) 154 in storage 134. More generally, as used herein, the term "databases" refers to any collection of data regardless of the particular physical representation. By way of illustration, the databases 156–157 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data which is described by a data repository abstraction 148.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by the data abstraction model (DAM) 148 of the abstract query interface 146. The abstract queries are processed by a runtime component 150 which transforms the abstract queries into a form (referred to herein as a concrete query) consistent with the physical representation of the data contained in one or more of the databases 156–157. In particular, this processing is performed by a physical query builder 161 of the runtime component 150. The runtime component 150 also includes an analysis tool 162, so-called because it enables a data analysis feature described herein. Illustratively, the analysis tool 162 includes a DAM generator 164, a query augmenter 166 and a table builder 168. It is noted that the functions of the runtime component 150 are merely illustrative. Persons skilled in the art will recognize that these functions may be implemented elsewhere (e.g., in the database management system 154 itself). Each of the components/functions of the abstract query interface 146 is further described below.

The abstract queries processed by the runtime component 150 may be configured to access the data and return results, or to modify (i.e., insert, delete or update) the data. In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the process 138 may respond to requests to access a database(s) 156, which illustratively resides on the server 104. Incoming client requests for data from a database 156–157 invoke an application 140. When executed by the processor 130, the application 140 causes the server computer 104 to perform the steps or elements embodying the various aspects of the invention, including accessing the database(s) 156–157. In one embodiment, the application 140 comprises a plurality of servlets configured to build GUI elements, which are then rendered by the browser program 122. Where the remote databases 157 are accessed via the application 140, the data abstraction model 148 is configured with a location specification identifying the database containing the data to be retrieved. This latter embodiment will be described in more detail below.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 138 shown in FIG. 1 is merely illustrative and other embodiments adapted to support any known and unknown protocols are contemplated.

Logical/Runtime View of Environment

Figure 2A:
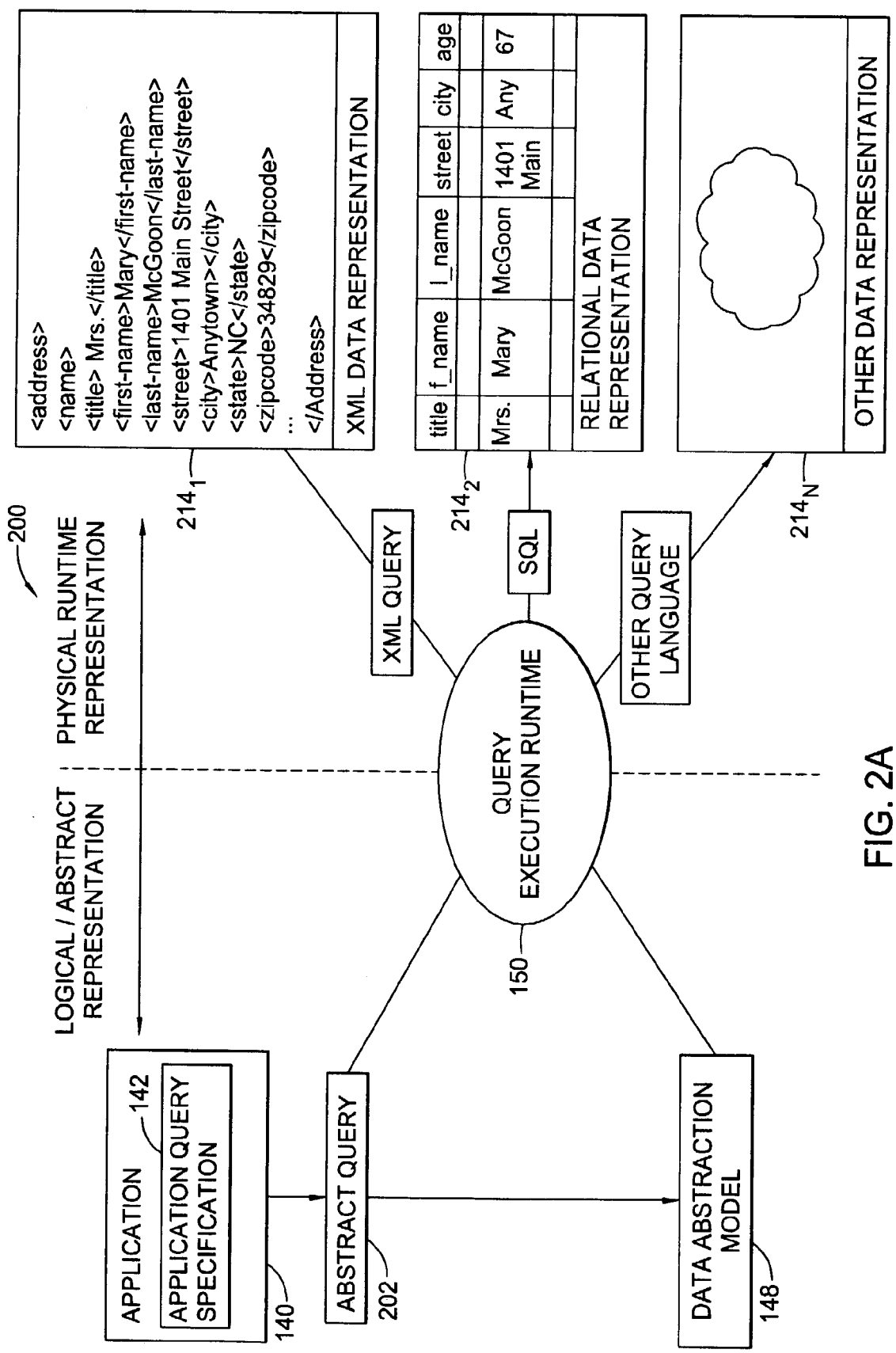
FIG. 2 is a relational view of software components of one embodiment of the invention configured to process queries against a physical data source through an abstract representation of the physical data source.
Figure 2B:
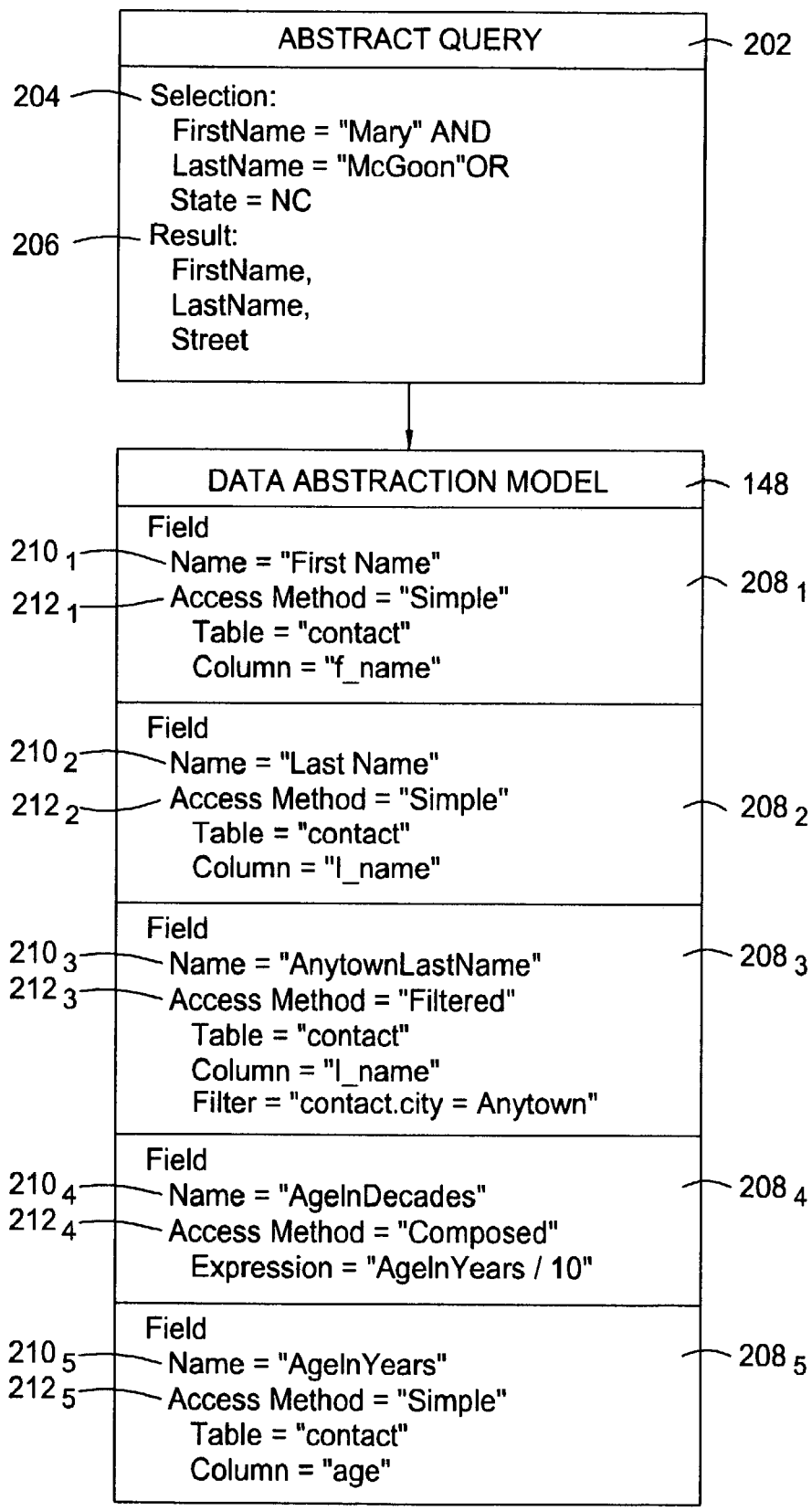

FIGS. 2A–B show a plurality of interrelated components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the databases 156–157. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data abstraction model 148. In general, the data abstraction model 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the databases 156–157, thereby allowing queries to be formed that are loosely coupled to the underlying data representation. The data to which logical fields of the DAM 148 are mapped may be located in a single repository (i.e., source) of data or a plurality of different data repositories. Thus, the DAM 148 may provide a logical view of one or more underlying data repositories. By using an abstract representation of a data repository, the underlying physical representation can be more easily changed or replaced without affecting the application making the changes. Instead, the abstract representation is changed with no changes required by the application. In addition, multiple abstract data representations can be defined to support different applications against the same underlying database schema that may have different default values or required fields.

In general, the data abstraction model 148 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ . . . $214_N$ in a database (e.g., one of the databases 156) according to parameters referred to herein as physical location parameters. By way of illustration, two data representations are shown, an XML data representation $214_1$ and a relational data representation $214_2$. However, the physical data representation $214_N$ indicates that any other data representation, known or unknown, is contemplated.

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact", where the table name and the column name are the physical location parameters of the access method $212_1$. The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may computed. In the example illustrated in FIG. 2B the composed field access method $212_3$ maps the logical field name $210_3$ "AgeInDecades" to "AgeInYears/10". Another example is a sales tax field that is composed by multiplying a sales price field by a sales tax rate.

It is noted that the data abstraction model 148 shown in FIG. 2B is merely illustrative of selected logical field specifications and is not intended to be comprehensive. As such, the abstract query 202 shown in FIG. 2B includes some logical fields for which specifications are not shown in the data abstraction model 148, such as "State" and "Street".

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data abstraction model 148 shown in FIG. 2A are representative of logical fields mapped to data represented in the relational data representation $214_2$. However, other instances of the data abstraction model 148 map logical fields to other physical data representations, such as XML. Further, in one embodiment, a data abstraction model 148 is configured with access methods for procedural data representations.

An illustrative abstract query corresponding to the abstract query 202 shown in FIG. 2 is shown in Table I below. By way of illustration, the data repository abstraction 148 is defined using XML. However, any other language may be used to advantage.

TABLE I

QUERY EXAMPLE

| | |
|---|---|
| 001 | <?xml version="1.0"?> |
| 002 | <!--Query string representation: (FirstName = "Mary" AND |
| 003 | LastName ="McGoon") OR State = "NC"--> |
| 004 | <QueryAbstraction> |
| 005 |   <Selection> |
| 006 |     <Condition internalID="4"> |
| 007 |       <Condition field="FirstName" operator="EQ" value= |
| 008 | "Mary" internalID="1"/> |
| 009 |       <Condition field="LastName" operator="EQ" value= |
| 010 | "McGoon" internalID="3" relOperator="AND"></Condition> |
| 011 |     </Condition> |
| 012 |     <Condition field="State" operator="EQ" value="NC" |
| 013 | internalID="2" relOperator="OR"></Condition> |
| 014 |   </Selection> |
| 015 |   <Results> |
| 016 |     <Field name="FirstName"/> |
| 017 |     <Field name="LastName"/> |
| 018 |     <Field name="State"/> |
| 019 |   </Results> |
| 020 | </QueryAbstraction> |

Illustratively, the abstract query shown in Table I includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data abstraction model 148 corresponding to the abstract query in Table I is shown in Table II below. By way of illustration, the data abstraction model 148 is defined using XML. However, any other language may be used to advantage.

TABLE II

DATA ABSTRACTION MODEL EXAMPLE

| | |
|---|---|
| 001 | <?xml version="1.0"?> |
| 002 | <DataRepository> |
| 003 |   <Category name="Demographic"> |
| 004 |     <Field queryable="Yes" name="FirstName" displayable="Yes"> |
| 005 |       <AccessMethod> |
| 006 |         <Simple columnName="f_name" tableName="contact"></Simple> |
| 007 |       </AccessMethod> |
| 008 |       <Type baseType="char"></Type> |
| 009 |     </Field> |
| 010 |     <Field queryable="Yes" name="LastName" displayable="Yes"> |
| 011 |       <AccessMethod> |
| 012 |         <Simple columnName="l_name" tableName="contact"></Simple> |
| 013 |       </AccessMethod> |
| 014 |       <Type baseType="char"></Type> |
| 015 |     </Field> |
| 016 |     <Field queryable="Yes" name="State" displayable="Yes"> |
| 017 |       <AccessMethod> |
| 018 |         <Simple columnName="state" tableName="contact"></Simple> |
| 019 |       </AccessMethod> |
| 020 |       <Type baseType="char"></Type> |
| 021 |     </Field> |

TABLE II-continued

DATA ABSTRACTION MODEL EXAMPLE

022  </Category>
023  </DataRepository>

Note that lines 004–009 correspond to the first field specification 208₁ of the DAM 148 shown in FIG. 2B and lines 010–015 correspond to the second field specification 208₂. For brevity, the other field specifications defined in Table I have not been shown in FIG. 2B. Note also that Table I illustrates a category, in this case "Demographic". A category is a grouping of one or more logical fields. In the present example, "First Name", "Last Name" and "State" are logical fields belonging to the common category, "Demographic".

In any case, a data abstraction model 148 contains (or refers to) at least one access method that maps a logical field to physical data. However, the foregoing embodiments are merely illustrative and the logical field specifications may include a variety of other metadata. In one embodiment, the access methods are further configured with a location specification defining a location of the data associated with the logical field. In this way, the data abstraction model 148 is extended to include description of a multiplicity of data sources that can be local and/or distributed across a network environment. The data sources can be using a multitude of different data representations and data access techniques. In this manner, an infrastructure is provided which is capable of capitalizing on the distributed environments prevalent today. One approach for accessing a multiplicity of data sources is described in more detail in U.S. patent application Ser. No. 10/131,984, entitled "REMOTE DATA ACCESS AND INTEGRATION OF DISTRIBUTED DATA SOURCES THROUGH DATA SCHEMA AND QUERY ABSTRACTION" and assigned to International Business Machines, Inc.

Figure 3:
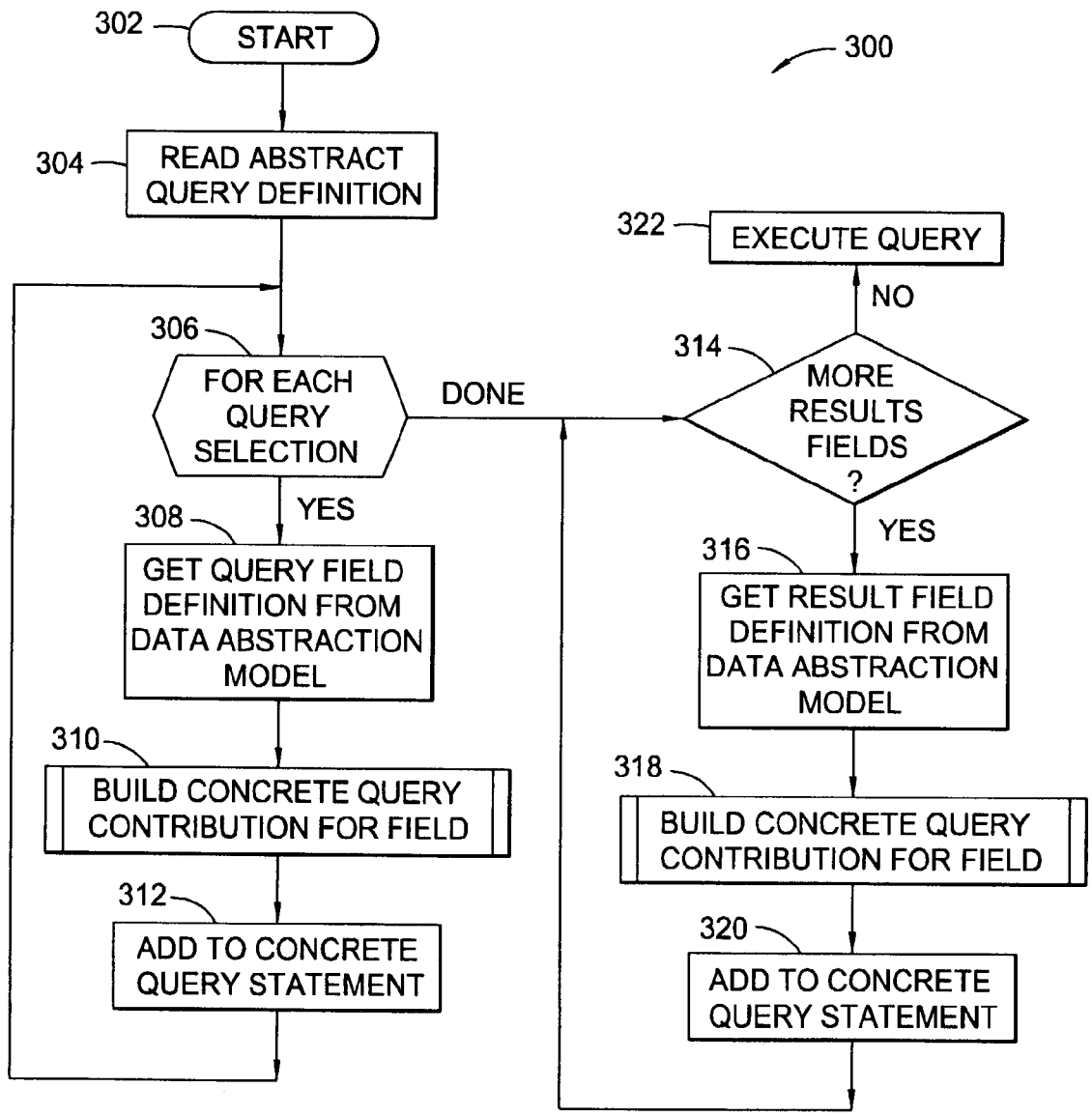
FIG. 3 is a flow chart illustrating the operation of a runtime component.

FIG. 3 shows an illustrative runtime method 300 exemplifying one embodiment of the operation of the runtime component 150. The method 300 is entered at step 302 when the runtime component 150 receives as input an instance of an abstract query (such as the abstract query 202 shown in FIG. 2). At step 304, the runtime component 150 reads and parses the instance of the abstract query and locates individual selection criteria and desired result fields. At step 306, the runtime component 150 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from a physical data repository, represented by the databases 156–157 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
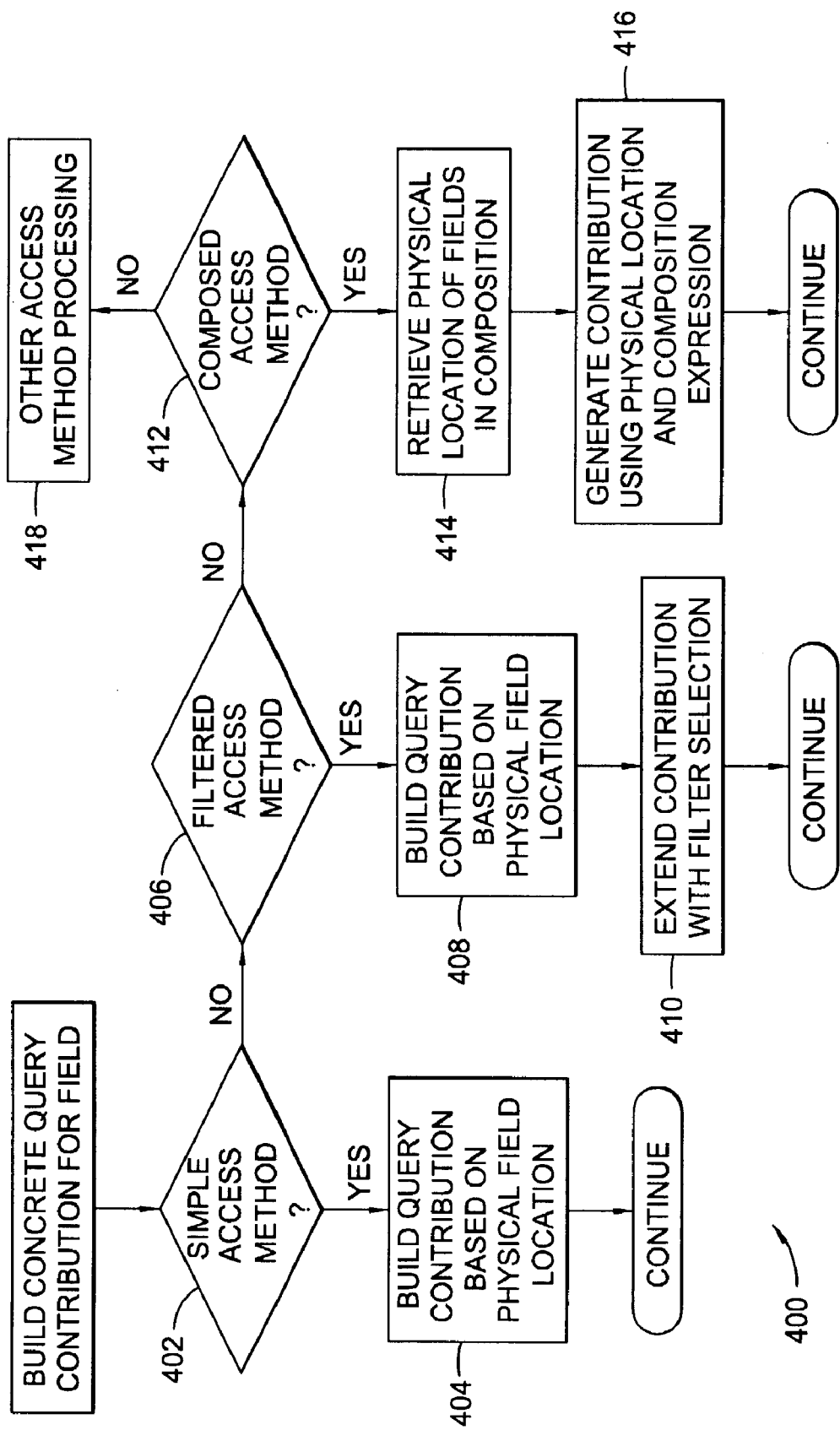
FIG. 4 is a flow chart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Data Analysis

In one embodiment, a user invokes the tool 162 to perform iterative data analysis. Illustratively the tool 162 performs various functions including augmenting the original user-defined abstract query (a function performed by the query augmenter 166), extending the underlying data repository 156 with query results of the executed augmented query (a function performed by the table builder 168) and extending the data abstraction model 148 with additional metadata to account for the physical data added to the underlying data repository (i.e., the query results of the executed augmented query).

Query augmentation is a function performed by the query augmenter 166. Since a user invokes the tool 162 when they intend to perform additional queries to correlate initial query results with other information in a data repository, the specified set of logical return fields (i.e., the set of logical fields in the abstract query to be returned) is extended to include fields (e.g., key fields) that may be used to correlate with other data entities in the data repository being queried.

Extending the data abstraction model 148 is a function of the DAM generator 164. A data abstraction model is augmented for each iterative query based on the results of the executed augmented query. That is, the DAM is augmented to include a logical field for each physical field (e.g., column in a relational database) in the result set of the executed query. A subsequent query is then executed based on the augmented DAM. This may be an iterative process, so that each query execution results in another update to the DAM. In addition, the DAM may be augmented with relationship metadata specifying relationships between the results of the last executed query and the other available data of a database. In one embodiment, an augmented DAM persists in memory only for a user session. For example, an updated DAM may be discarded once a user logs off of the system. Alternatively, an augmented DAM may be stored and retrieved for later use.

Extending the underlying data repository with the results of an augmented query is a function of the table builder 168. As noted above, the invention may be used to advantage with any data schema. Accordingly, it is emphasized that the term "table builder" is merely illustrative of one embodiment and does not limit the scope of the invention to data organized as tables.

Figure 5:
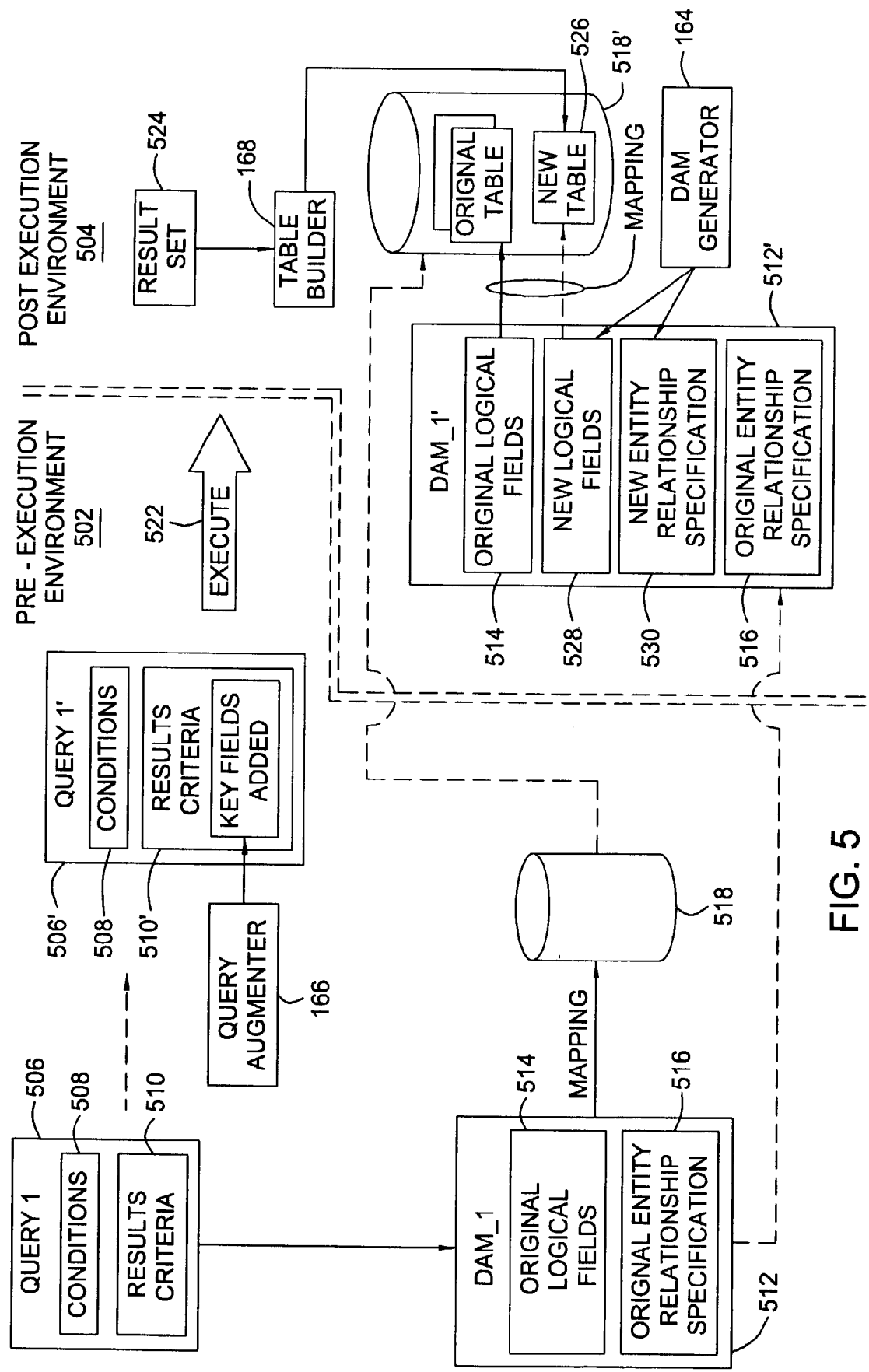
FIG. 5 is a block diagram showing a query augmenter configured to add result fields to an abstract query and a data repository abstraction generator configured to generate abstract data models mapping logical fields to results of an augmented query.

Referring now to FIG. 5, a first DAM 512 (DAM_1) is shown in a pre-execution environment 502. The DAM 512 includes a plurality of logical fields 514 (shown as "original logical fields") that map to data in a database 506, and a relationship specification 516 (shown as "original relationship specification"). An abstract query 506 issued by a requesting entity (e.g., a user or application) against a database 518 is configured with conditions 508 and return criteria 510. The conditions 508 generally include one or more logical fields defined in the first DAM 512 and a related value for each field. An illustrative condition may be "State=Ohio". Multiple conditions may be connected by Boolean operators such as AND and OR. As an example consider the following: (Gender='Female' AND State='Ohio'). The result criteria 510 includes one or more logical fields for which results are to be returned. In an SQL counterpart statement (after the abstract query 506 is transformed into a concrete query), the return criteria 510 are the SELECT clause and the conditions 508 are the WHERE clause of the statement.

Prior to execution, the query augmenter 166 is invoked to add additional result fields 520 to the results criteria 510 of the query 506. In particular, the added result fields are those key fields required to correlate the data returned from the query 506 with additional data that exists in other, related entities within the database 518. Adding these key fields to the query 506 results in an augmented query 506'.

When executed (represented by the arrow 522), the augmented query 506' returns a result set 524. The table builder 168 formats the result set 524 according to the schema of the database 518 and stores the resulting data structure 526 to the database, resulting in an updated database 518'. The DAM generator 164 creates new logical fields 528 which map to the physical fields of the data structure 526 (mapping between physical fields and the new logical fields 528 is identified by a dashed line, as distinguished from the solid line representing mapping between physical fields and the original logical fields 514). The DAM generator 164 also updates the original relationship specification 516 with new entity relationships 530, resulting in the augmented DAM 512' (DAM_1). This process may be performed for each successive abstract query.

Figure 6:
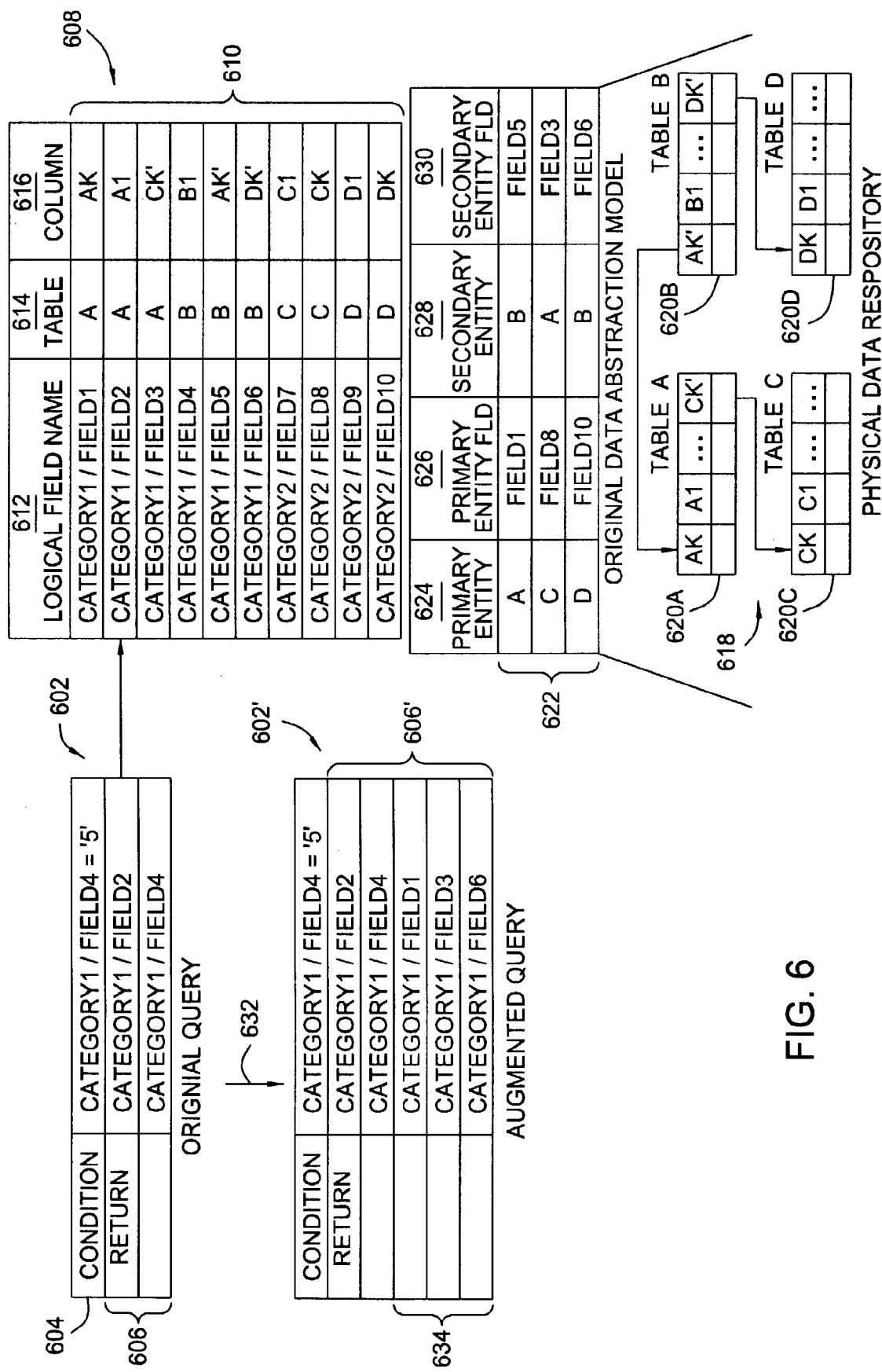
FIG. 6 is a block diagram illustrating the augmentation of an abstract query based on defined relationships between user-specified result fields and other logical fields.

Referring now to FIG. 6, additional details of the invention are described. Illustratively, FIG. 6 shows an initial DAM 608. The DAM 608 includes a plurality of field specifications 610 each of which map to data in a data repository 618. In the present example, the data repository 618 is a relational database including a plurality of tables 620A–D (four shown). Accordingly, the field specifications 610 are defined by a logical field name 612, a table name 614 and a column name 616. As described above with respect to FIG. 2B, the values of the table name 614 and column name 616 are the parameters passed to the access method of the respective logical field in order to retrieve data from the repository 618. Illustratively, the logical fields also include category metadata, whereby the logical fields 1–6 are part of Category 1 and logical fields 7–10 are part of Category 2.

A first abstract query 602 is shown configured with a condition 604 and return criteria 606. The condition 604 and return criteria 606 of the abstract query 602 are each configured with one or more logical fields, each of which are represented in the DAM 608. By way of example, the condition 604 specifies a value of "5" for Field 4 and the return criteria 606 specifies that data is to be returned for Field 2 and Field 4 where the condition 604 is satisfied.

The DAM 608 further includes a relationship specification 622. In general, the relationship specification 622 specifies relationships between logical fields which correspond to defined relationships between respective physical fields. Illustratively, the database 618 has a plurality of primary-foreign key relationships defined. Each foreign key is identified by an apostrophe (') and its relationship to a primary key is represented by an arrow connecting the respective columns. In one embodiment, the relationship specification 622 includes a "primary entity" column 624, a "primary entity field" column 626, a "secondary entity" column 628 and a "secondary entity field" column 630. The "primary entity" column 624 contains entries corresponding to tables of the database 618. The "primary entity field" column 626 contains entries corresponding to logical fields of the DAM 608. As such, the columns 624 and 626 identify a primary entity column of the database 618. The columns 628 and 630 of the relationship specification 622 identify a secondary entity column of the database 618 having a relationship with the primary entity column. For example, the first row in the relationship specification 622 identifies a relationship between the column AK of TABLE A and column AK' in TABLE B. It is noted that, in an alternative embodiment, the relationships in the relationship specification 622 may be described using only the "primary entity field" column 626 and the "secondary entity field" column 630 (i.e., without reference to the "primary entity" column 624 and the "secondary entity" column 628.

A user may then submit an abstract query 602 for execution with respect to the DAM 608. Prior to execution, the query augmenter 166 augments (represented by the arrow 632) the abstract query 602 to produce an augmented query 602'. In general, the augmentation process adds additional fields to the results criteria 606 to produce augmented results criteria 606'. The additional fields 634 added to the results criteria 606 of the abstract query 602 are selected according defined relationships (i.e., defined in the relationship specification 622) between physical fields of the corresponding tables associated with each of the user-specified logical fields in the results criteria 606. The query augmentation process will be described in more detail below with respect to FIG. 8.

Figure 7:
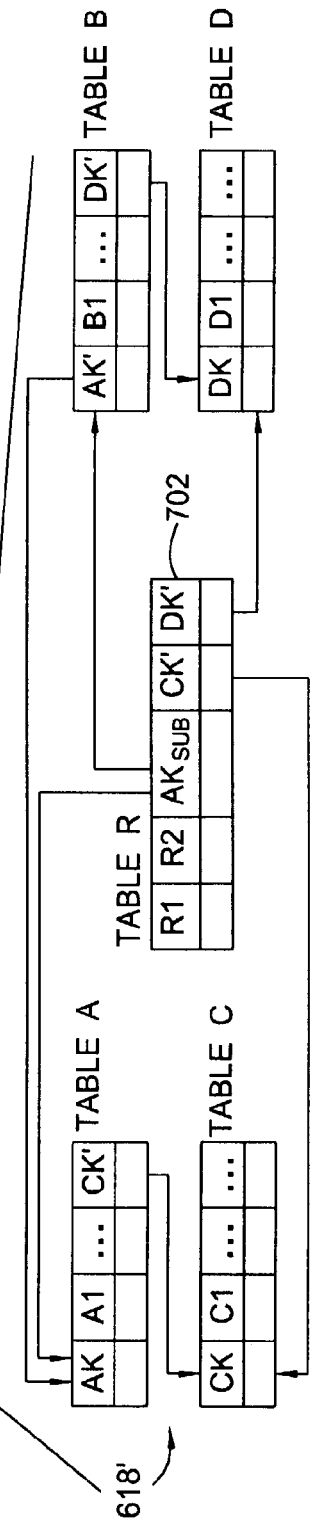
FIG. 7 is a block diagram illustrating the generation of an abstract data model based on results of an augmented abstract query.

Reference is now made to FIG. 7 to describe the environment after execution of the augmented abstract query 602'. Following execution of the augmented abstract query 602', the database 618 is updated to include a table 702 (TABLE R) corresponding to results returned for the augmented abstract query 602'. The table 702 is created by the table builder 168 and is arranged to be consistent with the particular schema of the database 618 (in the present example, the database 618 is a relational database). The resulting database 618', therefore, includes all the original data of the original database 618 as well as the results of the augmented query 602'. It is noted that, in the present example, the first two columns (R1 and R2) of the result table 702 correspond to the columns A1 and B1 (as per the original result fields 606 of the pre-augmented query 602). The last three columns in the illustrative result table 702 are the columns corresponding to the additional fields of the augmented query 606'. Each of the result columns may include only a subset of entries of their corresponding original columns, since only those results satisfying the condition 604 are returned. Accordingly, those columns corresponding to user-specified result fields are indicated by an "R", as in R1 and R2; and those columns corresponding to augmented result fields are indicated by a subscript, "sub", as in $AK_{sub}$ which corresponds to the original column AK, and $CK'_{sub}$ and $DK'_{sub}$ which correspond to the original columns CK' AND DK', respectively.

Further, the DAM generator 162 generates an augmented DAM 608' based on the results returned for the augmented abstract query 602'. Specifically, the DAM generator 162 updates the original DAM 608 to include additional logical fields 704 mapping to each field (i.e., each column) of the generated table 702.

In one aspect, the augmented DAM 608' also reflects relationships between columns of the generated table 702 and the original tables 620A–D of the original database 618. In the physical data, these relationships are represented by arrows connecting selected columns of the table 702 with columns of the original tables 620A–D. In the augmented DAM 608', these relationships are represented by additional fields 706 of the updated entity relationship specification 622'.

Figure 8:
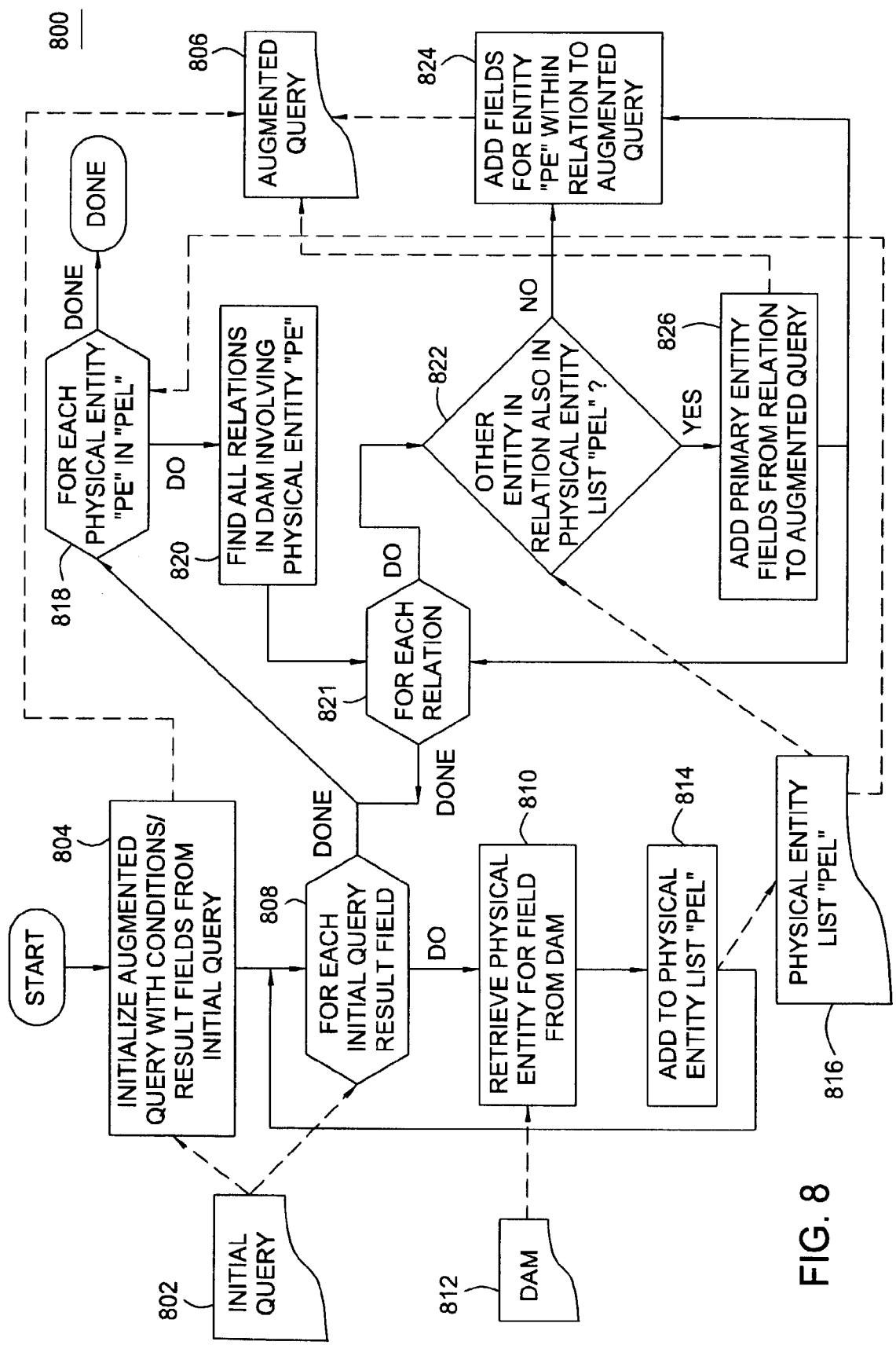
FIG. 8 it is a flow chart illustrating an algorithm to augment an abstract query.

Referring now to FIG. 8, a flowchart illustrates one embodiment of a method 800 implemented by the query augmenter 166 for creating an augmented query from an initial query 802. At step 804, an augmented query 806 is initialized with the conditions and result fields from the initial query 802. A loop is then entered (at step 808) for each initial query result field. For a given result field of the initial query 808, the DAM 812 is accessed to retrieve the corresponding physical entity information (step 814), which information is then stored to a physical entity list 816 (step 814).

After populating the physical entity list 816 with a reference to the corresponding physical entity for each result field of the initial query 808, a loop is entered for each physical entity referenced in the physical entity list 816 (step 818). The loop includes, for a given physical entity, identifying all relations in the DAM 812 involving the given physical entity (step 820). That is, the entity relationship specification of the DAM 812 (e.g., the entity relationship specification 622 of FIG. 6) is accessed to determine each relationship involving the given physical entity. The query augmenter 166 then determines, for each relationship (step 821), whether each identified related entity is already included in the physical entity list 816 (step 822). If not, the specified logical fields (i.e., the key fields) for the given physical entity are added to the augmented query 806 (step 824). If so, the primary entity fields (i.e., the primary key fields) associated with the primary entity of the given relationship (as specified in the entity relationship specification) are added to the augmented query 806. When each relationship for each physical entity in the physical entity list 816 has been processed in this manner the method 800 is complete.

The foregoing method may be illustrated with reference to FIG. 6. For the first of the two return fields of the initial query 602, i.e., Field2, the corresponding physical entity is Table A (determined at step 810). Referencing the entity relationship specification 622, the query augmenter 166 determines that the first and second relationships of the specification 622 include Table A (step 820). The query augmenter 166 then determines whether the other physical entity of each relationship is already in the physical entity list 816 (step 822). In this illustration, the first relationship relates Table A and Table B and the second relationship relates Table C and Table A. Regarding the first relationship, Table B is already included in the physical entity list 816 as a result of the initial return field, Field4; therefore, the primary entity field (specified in the primary entity field column 626 of the relationship specification 622), Field1, is added to the augmented query 602'. Regarding the second relationship, Table C is not included in the physical entity list 816. Therefore, the specified key field corresponding to Table A, i.e., Field3, is added to the augmented query 602'. The same processing is repeated for Table B, the physical entity corresponding to the initial return field, Field4, resulting in the addition of Field6 being added to the augmented query 602.

Figure 9:
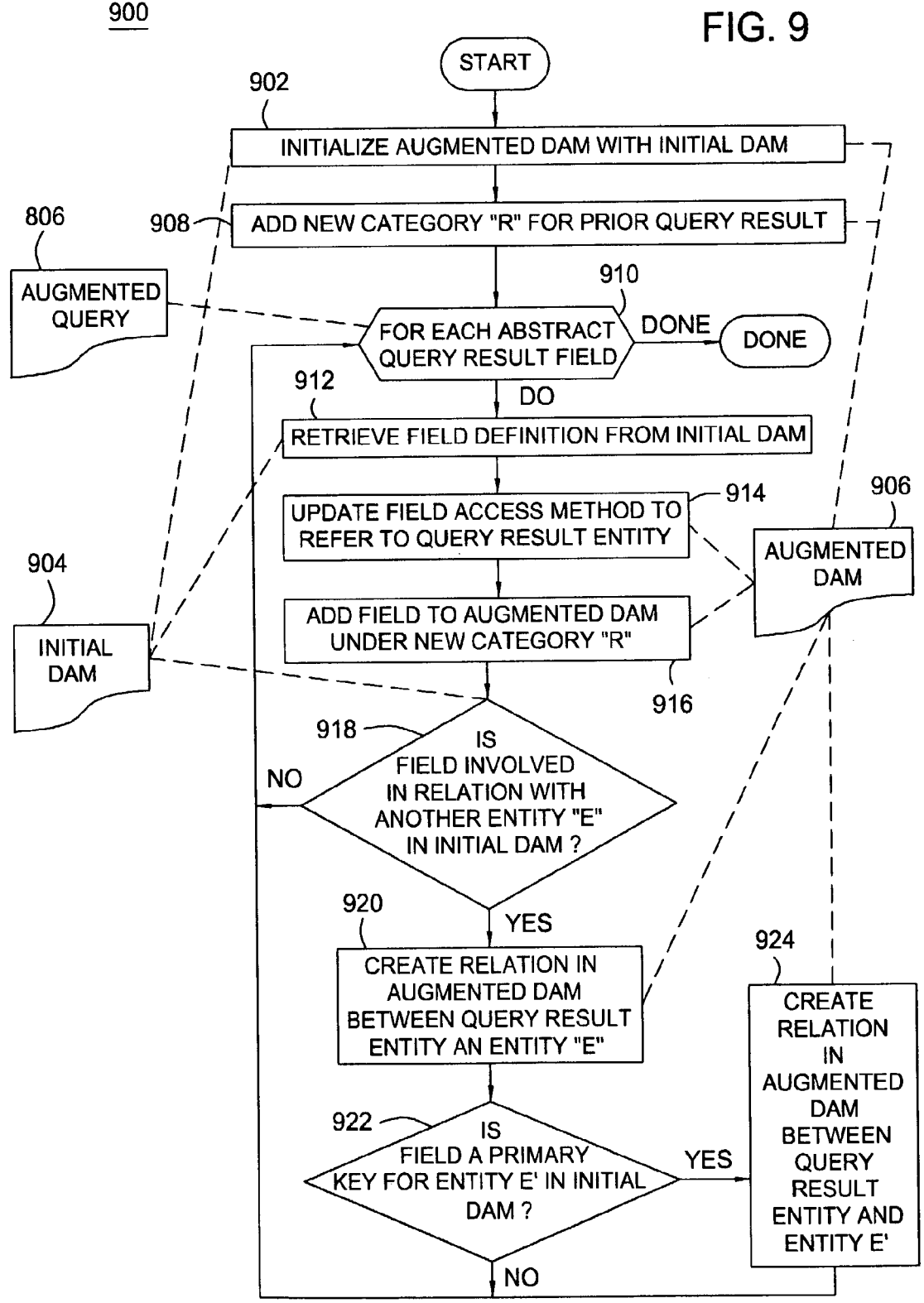
FIG. 9 it is a flow chart illustrating an algorithm to augment an abstract data model based on augmented query.

Referring now to FIG. 9, a flowchart illustrates one embodiment of a method 800 implemented by the DAM generator 164 for creating an updated DAM. The method 900 is entered after executing the augmented abstract query 806 (as performed by the method 800 described with reference to FIG. 8). At step 902, the DAM generator 164 initializes an augmented DAM 906 with an initial DAM 904 (step 902). At step 908, a new category is added to the augmented DAM 906 for the query results of the augmented query 806. A loop is then entered (at step 910) for each result field in the result criteria of the augmented abstract query 806. For a given result field, the processing performed in the loop includes retrieving (step 912), from the initial DAM 904, the field definition corresponding to the given result field. The field definition is then updated (step 914) so that the access method refers to the corresponding query result entity (e.g., the appropriate column of Table R shown in FIG. 7). The updated field definition is then added to the augmented DAM 906 (step 916). The DAM generator 164 then determines (step 918) whether the given result field of the augmented query is involved in a relationship with another entity (e.g., "E1") as defined in the entity specification of the initial DAM 904. If so, a relationship is created in the entity relationship specification of the augmented DAM 906 between the query result entity (i.e., the entity corresponding the given result field of the augmented query) and the other entity, E1 (step 920). Further, if the given result field of the augmented query is a primary key for yet another entity (e.g., "E2"), as determined at step 922, then a relationship is created in the entity relationship specification of the augmented DAM 906 between the query result entity and the other entity, E2 (step 924). The foregoing process is preformed for each result field of the augmented query.

The method 900 may be illustrated with reference to FIG. 6 and FIG. 7. Consider, for example, the first of the user-specified query result fields, "Category1/Field2". In this case, a new logical field "CategoryR/Field1" is added to the augmented the DAM 608'. The new logical field maps to Table R, Column R1. Since the corresponding query result field, "Category1/Field2", is not related to any other entity in the initial DAM 608, no new relations are created. The same is true for the new logical field "CategoryR/Field12". Consider now the first of the added query result fields 634 in the augmented query 602', i.e., "Category1/Field1". In this case, a new logical field "CategoryR/Field13" is added to the augmented the DAM 608'. The new logical field maps to Table R, Column $AK_{sub}$. Since "Category1/Field1" is involved in a relation with another entity as defined in the entity relationship specification 622 of the initial DAM 608, i.e., "Category1/Field1" is related to "Category1/Field5", a new relationship between the new logical field "CategoryR/Field13" and "Category1/Field5" is defined in the augmented entity relationship specification 622', as represented by the second row of the additional logical fields 706 in FIG. 7. In addition, since the abstract query result field, "Category1/Field1" is a primary key field, a new relationship between the new logical field "CategoryR/Field13" and "Category1/Field1" is defined in the augmented entity relationship specification 622', as represented by the first row of the additional logical fields 706 in FIG. 7.

Figure 11:
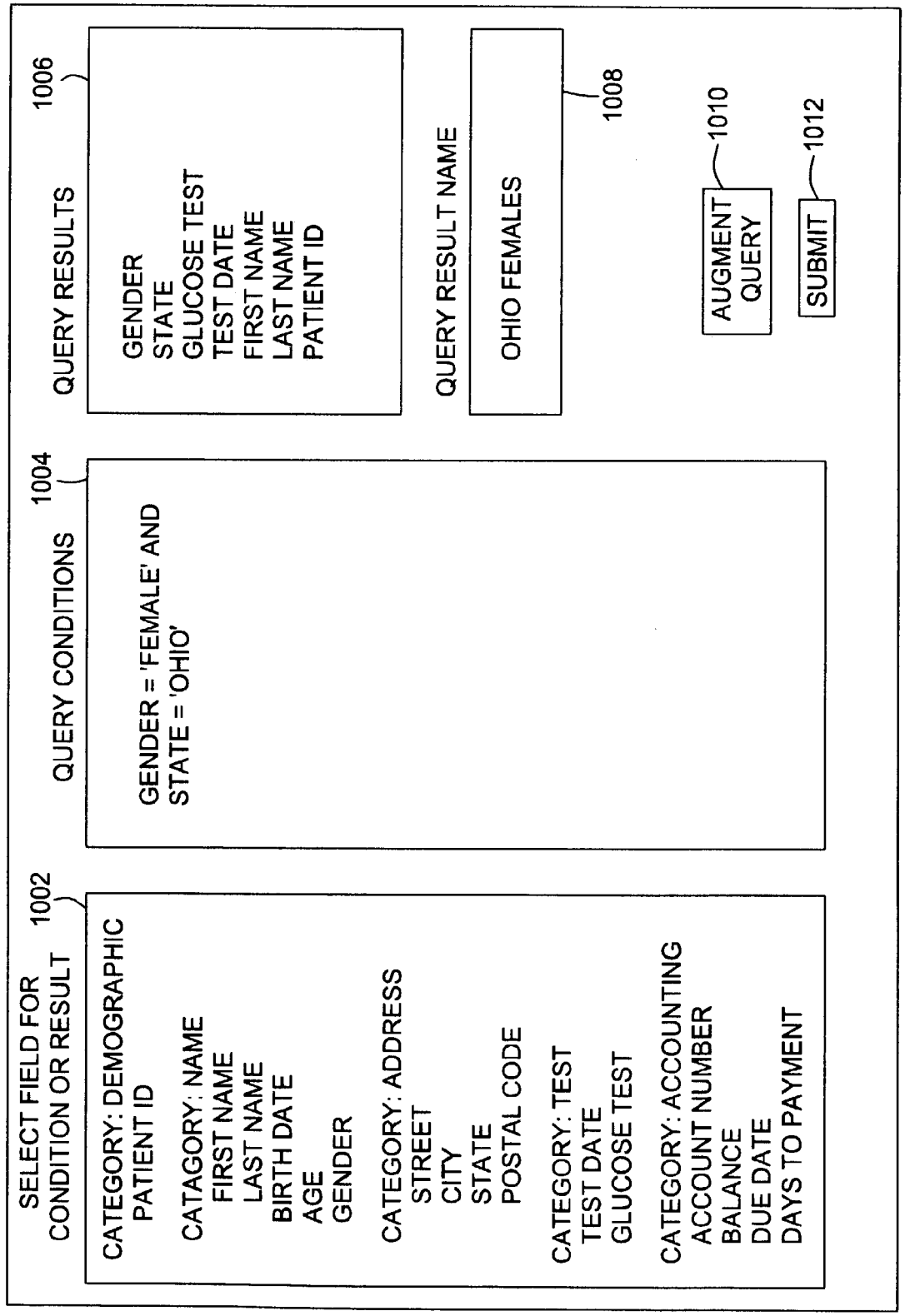
Figure 12:
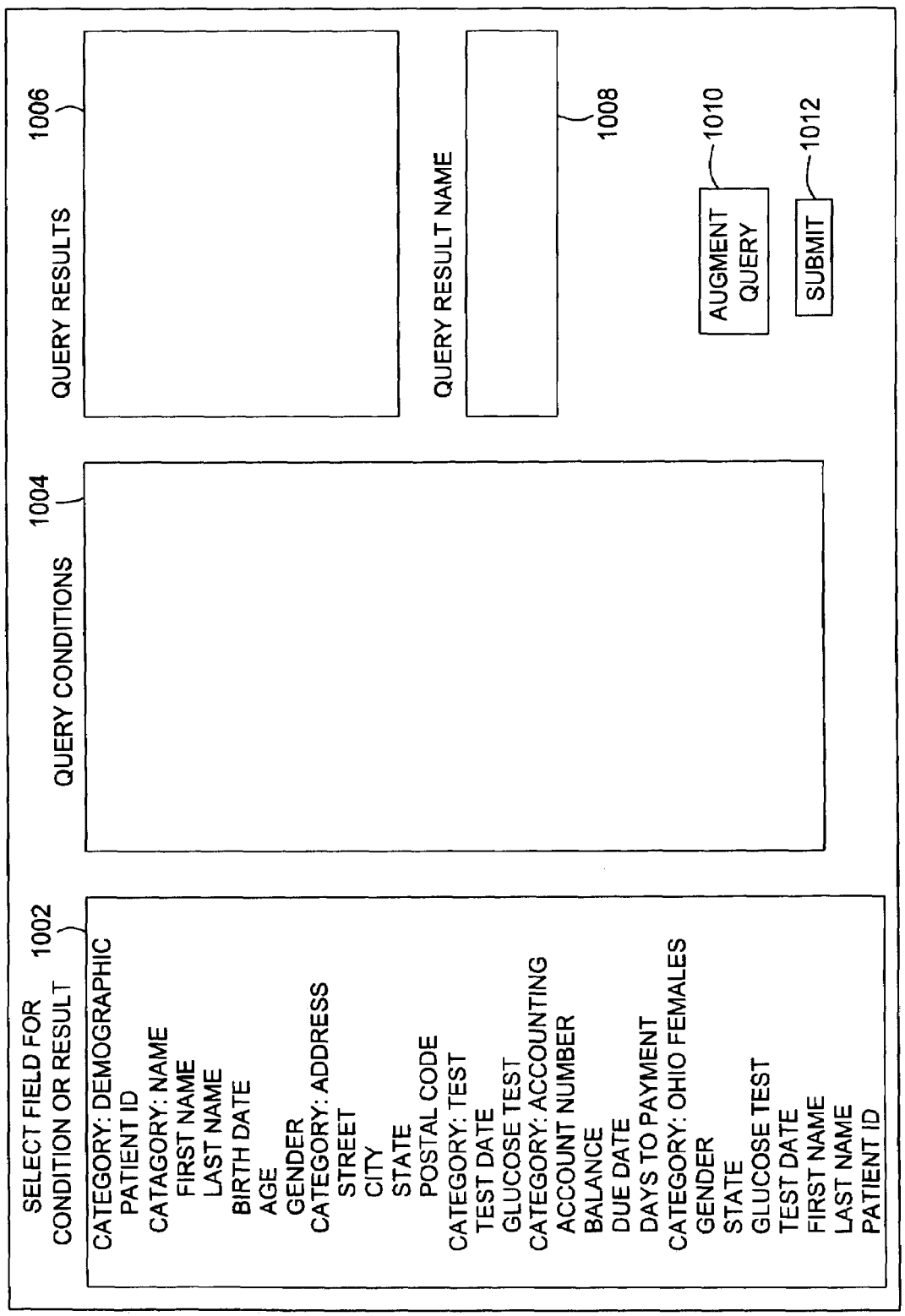

In one aspect, an advantage is provided to users constructing queries against data repository abstraction models. Since the view of the underlying data is dictated by the DAM, the user is given an increasingly augmented view of the data with each successive query. The user may then create queries including data selection conditions that involve information in the initial DAM, information from prior query results (i.e., information from the augmented DAM) or both. This aspect of the invention may be illustrated with reference to FIGS. 10–12.

Figure 10:
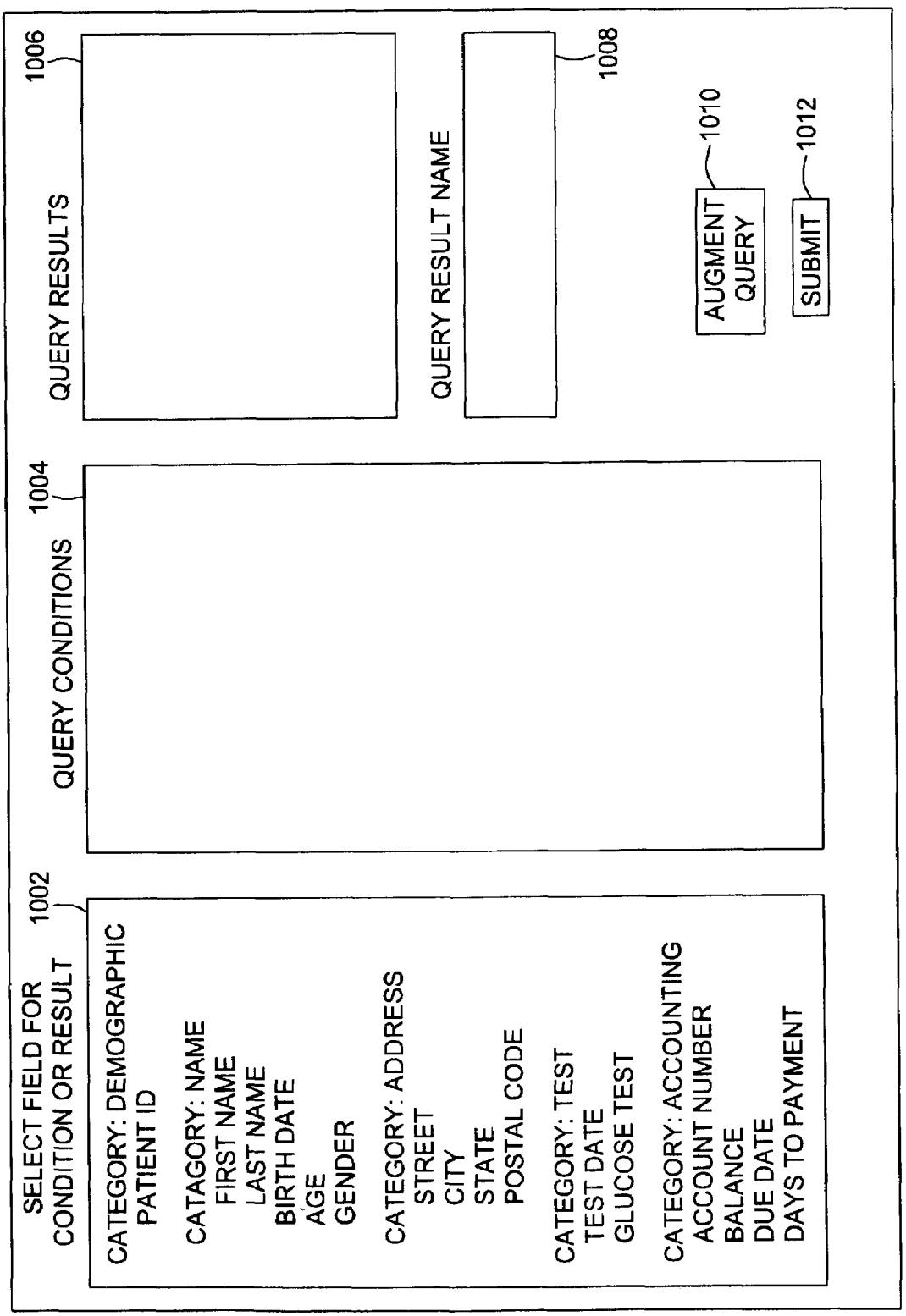
FIGS. 10–12 are screens of a user interface configured for constructing abstract queries based on displayed logical fields, each of which is defined by an abstract data model.

Referring first to FIG. 10, a screen 1000 is shown which may be viewed through the browser program 122 (FIG. 1). The screen 1000 includes a Selection panel 1002, a Query Conditions panel 1004, a Query Results Fields panel 1006 and a Query Result Name field 1008. The Selection panel 1002 displays each of the logical fields defined by a DAM. If defined, categories are also displayed. Using the displayed logical fields, the user may construct a query by specifying conditions in the Query Conditions panel 1004 and specifying result fields in the Query Results Fields panel 1006, as illustrated by the screen 1000 FIG. 11. In this particular illustration, user has specified query conditions for the logical fields Gender and State and the Query Results Fields panel 1006 includes six user-selected logical fields (result fields): Gender, State, Glucose Test, Test Date, First Name and Last Name. The user has selected Ohio Females (as shown in the Query Result Name field 1008) as the name under which to categorize the results of the query. The query augmenter 166 is then invoked (e.g., in response to the user clicking on an Augment Query button 1010), resulting in the addition of "Patient ID" as a result field in the Query Results Fields panel 1006. The query may then be executed by clicking the Submit the 1012. After execution of the query, the results of the query may be displayed to the user in another screen (not shown).

For the next query, the Selection panel 1002 shows the logical fields of the augmented DAM generated by the DAM generator 164 based on the query results fields of the executed augmented query. For the illustrative query of FIG. 11, the logical fields of the augmented DAM are shown under the user-specified category name (Ohio Females) in the Selection panel 1002 of FIG. 12. Accordingly, the displayed logical fields include Gender, State, Glucose Test, Test Date, First Name, Last Name, Patient ID. Based on the displayed logical fields, the user may construct another query. This process may be performed iteratively whereby the number of displayed/available logical fields is successively increased.

In various embodiments, numerous advantages may be provided. In some cases, these advantages may be substantial improvements over the prior art. Some of these advantages are now described. However, whether or not an embodiment achieves an advantage, and whether or not such an advantage may be considered a substantial improvement, is not limiting of the invention. Therefore, the advantages described below do not define or limit the invention, which is limited only by the claims that follow.

In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation different than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the ease-of-use for the application builder and the end-user is facilitated. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

In one aspect, this model allows solutions to be developed independent of the physical location or representation of the data used by the solution, making it possible to easily deploy the solution to a number of different data topologies and allowing the solution to function in cases where data is relocated or reorganized over time. In another aspect, this approach also simplifies the task of extending a solution to take advantage of additional information. Extensions are made at the abstract query level and do not require addition of software that is unique for the location or representation of the new data being accessed. This method provides a common data access method for software applications that is independent of the particular method used to access data and of the location of each item of data that is referenced. The physical data accessed via an abstract query may be represented relationally (in an existing relational database system), hierarchically (as XML) or in some other physical data representation model. A multitude of data access methods are also supported, including those based on existing data query methods such as SQL and XQuery and methods involving programmatic access to information such as retrieval of data through a Web Service invocation (e.g., using SOAP) or HTTP request.

While the foregoing is directed to embodiments of the present invention, other and further embodiments of the invention may be devised without departing from the basic scope thereof, and the scope thereof is determined by the claims that follow.

What is claimed is:

1. A method of using a logical model to query physical fields of physical data entities, comprising:
    defining the logical model to logically describe the physical fields; and
    for each abstract query comprising query conditions and query result fields to be returned, augmenting the logical model to logically describe, in addition to the physical fields, results returned for each abstract query based on the query result fields.

2. The method of claim 1, wherein the physical data entities comprise a plurality of tables in a database.

3. The method of claim 1, further comprising generating each abstract query with reference to the logical model.

4. The method of claim 1, further comprising transforming, with reference to the logical model, each abstract query into a form consistent with the physical data entities.

5. The method of claim 1, wherein a portion of the query result fields are user-selected and a remaining portion of the query result fields are computer-generated.

6. The method of claim 5, wherein defining the logical model further comprises logically defining key relationships between the physical fields and wherein the computer-selected query result fields are selected based on the key relationships.

7. The method of claim 1, wherein the logical model is represented by a plurality of logical fields in a user interface and wherein augmenting the logical model results in displaying additional logical fields in the user interface after execution of a given abstract query.

8. The method of claim 7, wherein the additional logical fields in the user interface correspond to the query result fields.

9. The method of claim 1, wherein defining the logical model to logically describe the data comprises defining a plurality of logical field definitions for different portions of the data and wherein augmenting the logical model for a given abstract query comprises adding additional logical field definitions for each of the query result fields of the given abstract query.

10. The method of claim 9, wherein each of the logical field definitions maps to a different physical field of the physical data entities.

11. The method of claim 1, wherein defining the logical model to logically describe the physical data entities comprises defining a plurality of logical field definitions for different fields of the physical data entities and wherein augmenting the logical model comprises, for each given query result field in a given abstract query:
    identifying a corresponding logical field definition from the logical model; and
    based on the corresponding logical field definition, generating a new logical field definition referring to a physical field of a result entity returned by the given result field.

12. The method of claim 11, wherein defining the logical model to logically describe the data comprises defining a plurality of relationships between logical field definitions and wherein augmenting the logical model further comprises generating an additional relationship between at least a portion of the new logical field definitions and at least one of the previously existing plurality of logical field definitions.

13. The method of claim 12, wherein generating the additional relationship comprises:
    determining whether a physical data entity corresponding to the new logical field definition has a key relationship with another physical data entity having a corresponding logical field definition in the logical model; and
if so:
   defining a relationship between the new logical field definition and the corresponding logical field definition of the physical data entity;
   determining whether the physical data entity corresponding to the new logical field definition is a primary key with respect to yet another physical data entity; and
   if so, defining a relationship between the new logical field definition and the yet another physical data entity.

14. A method of using a logical model to query data, comprising:
   defining the logical model to logically describe the data, wherein the logical model comprises a plurality of logical field definitions mapping to physical fields of physical entities of the data;
   receiving a user-defined abstract query, wherein the user-defined abstract query is created using the logical field definitions of the logical model and includes at least one condition and at least one user-selected result field selected from the logical field definitions;
   augmenting the user-defined abstract query with at least one computer-selected result field to produce an augmented abstract query; and wherein the augmented abstract query returns results for each of the user-selected result field and the computer-selected result field; and
   augmenting the logical model to logically describe, in addition to the data, the results returned based on the result fields.

15. The method of claim 14, wherein augmenting the user-defined abstract query comprises:
   for each result field of the augmented abstract query, determining a corresponding physical entity;
   for each corresponding physical entity, determining all key relations involving the corresponding physical entity, wherein each key relation relates fields of the corresponding physical entity to fields of a related physical entity as either primary or secondary with respect to the fields of the related physical entity;
   for each key relation involving the corresponding physical entity, determining whether at least one logical field definition corresponding to the related physical entity is included in the augmented abstract query; and
   if, for a given key relation involving the corresponding physical entity, at least one logical field definition corresponding to the related physical entity is included in the augmented abstract query: adding as the at least one computer-selected result field a logical field definition corresponding to a primary key field in the given key relation.

16. The method of claim 14, wherein each user-defined abstract query and each augmented abstract query is created with reference to the logical model.

17. The method of claim 14, further comprising, if, for the given key relation involving the corresponding physical entity, the logical field definition corresponding to the related physical entity is not included in the augmented abstract query:
   adding as the computer-selected result field a logical field definition corresponding to a key field of the corresponding physical field as defined by the given key relation.

18. The method of claim 14, wherein the key relations are defined in the logical model.

19. The method of claim 14, further comprising transforming, with reference to the logical model, each abstract query into a form consistent with the data.

20. The method of claim 14, wherein augmenting the logical model comprises, for each given result field in a given abstract query:
   identifying a corresponding logical field definition from the logical model; and
   based on the corresponding logical field definition, generating a new logical field definition referring to a physical field of a result entity returned by the given result field.

21. The method of claim 20, wherein defining the logical model to logically describe the data comprises defining a plurality of relationships between the logical field definitions and wherein augmenting the logical model further comprises generating an additional relationship between at least a portion of the new logical field definitions and at least one of the previously existing plurality of logical field definitions.

22. The method of claim 21, wherein generating the additional relationship comprises:
   determining whether a physical data entity corresponding to the new logical field definition has a key relationship with another physical data entity having a corresponding logical field definition in the logical model; and
   if so:
      defining a relationship between the new logical field definition and the corresponding logical field definition of the physical data entity:
      determining whether the physical data entity corresponding to the new logical field definition is a primary key with respect to yet another physical data entity; and
      if so, defining a relationship between the new logical field definition and the yet another physical data entity.

23. A method for processing abstract queries defined by logical fields, the method comprising:
   providing an initial abstract data model defining a plurality of logical fields mapped to physical data having a particular schema and further defining a plurality of relationships between at least a portion of the plurality of logical fields;
   receiving a first abstract query comprising at least one condition and a user-selected result field comprising at least one of the plurality of logical fields;
   based on defined relationships between the user-selected result field and the other plurality of logical fields, augmenting the first abstract query with at least one computer-selected logical field selected from the plurality of logical fields;
   transforming the first abstract query into a first executable query with reference to the initial abstract data model;
   executing the first executable query;
   returning results produced by execution of the first executable query; and
   adding at least one additional logical field to the initial abstract data model to produce a first augmented abstract data model, the at least one additional logical field mapping to at least a portion of the results.

24. The method of claim 23, wherein transforming comprises transforming the first abstract query into an SQL statement.

25. The method of claim 23, further comprising:
receiving a second abstract query comprising at least one condition and a user-selected result field comprising at least one of the logical fields of the augmented abstract data model;
based on defined relationships between the user-selected result field and at least one other of the plurality of logical fields of the first augmented abstract data model, augmenting the second abstract query with at least one computer-selected logical field selected from the plurality of logical fields of the first augmented abstract data model;
transforming the second abstract query into a second executable query with reference to the initial abstract data model;
executing the second executable query;
returning results produced by execution of the second executable query; and
adding at least another logical field to the first augmented abstract data model to produce a second augmented abstract data model, the at least another logical field mapping to at least a portion of the results returned by the second executable query.

26. The method of claim 23, further comprising iteratively augmenting each abstract query with computer-selected result fields and iteratively augmenting each abstract data model with logical fields mapping to results of an immediately preceding augmented abstract query.

27. The method of claim 26, further comprising iteratively augmenting each abstract data model with relationship specifications relating results returned from the immediately preceding augmented abstract query with other logical fields of an immediately preceding abstract data model.

28. A computer readable medium containing a program which, when executed, performs an operation with respect to abstract queries and a logical model comprising a plurality of logical field definitions mapping to physical fields of physical entities of the data, the operation comprising:
for each abstract query comprising query conditions and query result fields to be returned, augmenting the abstract query with at least one additional query result field, thereby producing an augmented abstract query; and
for each executed augmented abstract query which returns results based on the query result fields of the executed augmented abstract query, augmenting the logical model to logically describe the results returned for the executed augmented abstract query.

29. The computer readable medium of claim 28, wherein the physical data entities comprise a plurality of tables in a database.

30. The computer readable medium of claim 28, further comprising generating each abstract query with reference to a current instance of the logical model.

31. The computer readable medium of claim 28, further comprising transforming, with reference to a current instance of the logical model, each abstract query into a form consistent with the physical data entities.

32. The computer readable medium of claim 28, wherein augmenting the logical model comprises, for each given query result field of an executed augmented abstract query:
identifying a corresponding logical field definition from the logical model; and
based on the corresponding logical field definition, generating a new logical field definition referring to a physical field of a result entity returned by the given query result field.

33. The computer readable medium of claim 28, wherein the query result fields of the abstract query prior to augmentation, are user-selected.

34. The computer readable medium of claim 33, wherein the logical model further comprises key relationship definitions between the physical fields and wherein the at least one additional query result field is selected based on the key relationships definitions.

35. A computer readable signal-bearing storage medium containing a program which, when executed, performs an operation with respect to abstract queries and a logical model comprising a plurality of logical field definitions mapping to physical fields of physical entities of the data, the operation comprising:
receiving a user-defined abstract query, wherein the user-defined abstract query is created using the logical field definitions of the logical model and includes at least one condition and at least one user-selected result field selected from the logical field definitions; augmenting the user-defined abstract query with at least one computer-selected result field to produce an augmented abstract query; and wherein the augmented abstract query returns results for each of the user-selected result field and the computer-selected result field; and augmenting the logical model to logically describe, in addition to the data, the results returned based on the result fields.

36. The computer readable signal-bearing storage medium of claim 35, wherein augmenting the user-defined abstract query comprises: for each result field of the augmented abstract query, determining a corresponding physical entity; for each corresponding physical entity, determining all key relations involving the corresponding physical entity, wherein each key relation relates fields of the corresponding physical entity to fields of a related physical entity as either primary or secondary with respect to the fields of the related physical entity; for each key relation involving the corresponding physical entity, determining whether at least one logical field definition corresponding to the related physical entity is included in the augmented abstract query; and if, for a given key relation involving the corresponding physical entity, at least one logical field definition corresponding to the related physical entity is included in the augmented abstract query: adding as the at least one computer-selected result field a logical field definition corresponding to a primary key field in the given key relation.

37. The computer readable signal-bearing storage medium of claim 35, wherein each user-defined abstract query and each augmented abstract query is created with reference to the logical model.

38. The computer readable signal-bearing storage medium of claim 35, further comprising, if, for the given key relation involving the corresponding physical entity, the logical field definition corresponding to the related physical entity is not included in the augmented abstract query: adding as the computer-selected result field a logical field definition corresponding to a key field of the corresponding physical field as defined by the given key relation.

39. The computer readable medium of claim 35, wherein the key relations are defined in the logical model.

40. The computer readable signal-bearing storage medium of claim 35, further comprising transforming, with reference to the logical model, each abstract query into a form consistent with the data.

41. The computer readable signal-bearing storage medium of claim 35, wherein augmenting the logical model comprises, for each given result field in a given abstract query: identifying a corresponding logical field definition from the logical model; and based on the corresponding logical field definition, generating a new logical field definition referring to a physical field of a result entity returned by the given result field.

42. The computer readable signal-bearing storage medium of claim 41, wherein defining the logical model to logically describe the data comprises defining a plurality of relationships between the logical field definitions and wherein augmenting the logical model further comprises generating an additional relationship between at least a portion of the new logical field definitions and at least one of the previously existing plurality of logical field definitions.

43. The computer readable signal-bearing storage medium of claim 42, wherein generating the additional relationship comprises: determining whether a physical data entity corresponding to the new logical field definition has a key relationship with another physical data entity having a corresponding logical field definition in the logical model; and if so: defining a relationship between the new logical field definition and the corresponding logical field definition of the physical data entity; determining whether the physical data entity corresponding to the new logical field definition is a primary key with respect to yet another physical data entity; and if so, defining a relationship between the new logical field definition and the yet another physical data entity.

44. A computer system, comprising memory and at least one processor, and further comprising:
   a logical model comprising a plurality of logical field definitions mapping to physical fields of physical entities of data, whereby the logical model provides a logical view of the data;
   an abstract query augmenter configured to (i) receive an abstract query comprising at least one condition and at least one user-selected result field selected from the logical field definitions of the logical model; and (ii) augment the abstract query with at least one computer-selected result field selected from the logical field definitions of the logical model, thereby producing an augmented abstract query; and
   a logical model generator configured to augment the logical model with additional logical field definitions based on (i) the result fields of the augmented abstract query; and (ii) results returned for the augmented abstract query.

45. The system of claim 44, wherein the logical model further comprises a plurality of relationships defined between at least a portion of the plurality of logical field definitions and based on key relationships defined between the physical fields of the data.

46. The system of claim 44, wherein the logical model generator is further configured to augment the logical model with additional relationships defined between at least a portion of the additional logical field definitions and the previously existing plurality of logical field definitions.

47. The system of claim 44, wherein the logical model changes with each subsequent abstract query and further comprising a run-time component to transform, according to a current logical model, the abstract queries into physical queries consistent with the data.

48. The system of claim 44, wherein the logical model changes with each subsequent abstract query and further comprising an interface from which only those logical field definitions defined by a current logical model is selectable in generating abstract queries to access the data.

* * * * *